United States Patent

Copenhaver, Sr.

[11] Patent Number: 5,832,656
[45] Date of Patent: Nov. 10, 1998

[54] MOUSE TRAP

[76] Inventor: Richard W. Copenhaver, Sr., Sundown-Diamond C Ranch, CR 406 HC 4 Box 175, Blanco, Tex. 78606

[21] Appl. No.: 766,773
[22] Filed: Dec. 13, 1996
[51] Int. Cl.⁶ .................................................. A01M 23/20
[52] U.S. Cl. .................................................................. 43/61
[58] Field of Search ................................... 43/61, 60, 62, 43/58, 67

[56] References Cited

U.S. PATENT DOCUMENTS

| 11,942 | 11/1854 | Myers . | |
|---|---|---|---|
| 107,647 | 9/1870 | Bachman . | |
| 253,907 | 2/1882 | Andre . | |
| 425,136 | 4/1890 | Latta . | |
| 451,163 | 4/1891 | Skinner . | |
| 1,024,278 | 4/1912 | Niederlitz . | |
| 2,160,809 | 6/1939 | Burnley . | |
| 4,127,958 | 12/1978 | Peters et al. . | |
| 4,158,929 | 6/1979 | Custard . | |
| 4,231,180 | 11/1980 | Bare . | |
| 4,291,486 | 9/1981 | Lindley | 43/62 |
| 4,425,731 | 1/1984 | Orlando . | |
| 4,557,066 | 12/1985 | Godwin | 43/60 |
| 4,583,317 | 4/1986 | Beard . | |
| 4,949,499 | 8/1990 | Lindros | 43/61 |
| 5,044,111 | 9/1991 | Lindros | 43/61 |
| 5,175,957 | 1/1993 | West | 43/61 |

Primary Examiner—Kurt Rowan
Attorney, Agent, or Firm—Rader, Fishman & Grauer

[57] ABSTRACT

In order to support a bait which attracts a rodent into a trap, a recessed post member is formed on a lid member and secured to a post member formed on a housing member which is closed by the lid, using a tape which is lapped about the posts. The tape interferes with easy access to the bait so that a rodent will gnaw through the tape. Once the tape is broken its retaining function is removed and the door is free to close under the influence of a spring produced bias. The shape of the recessed post member is selected to reduce the amount of contact area with the tape and to facilitate release of the post from the binding hold of the tape once the tape is rent.

9 Claims, 7 Drawing Sheets

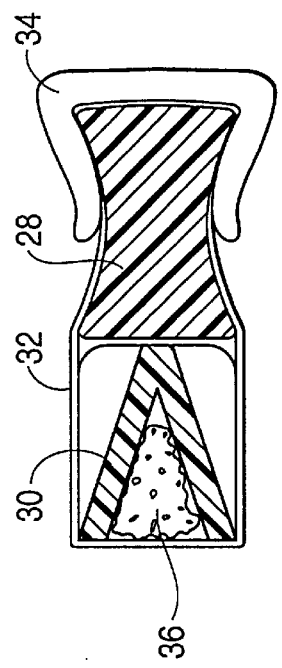
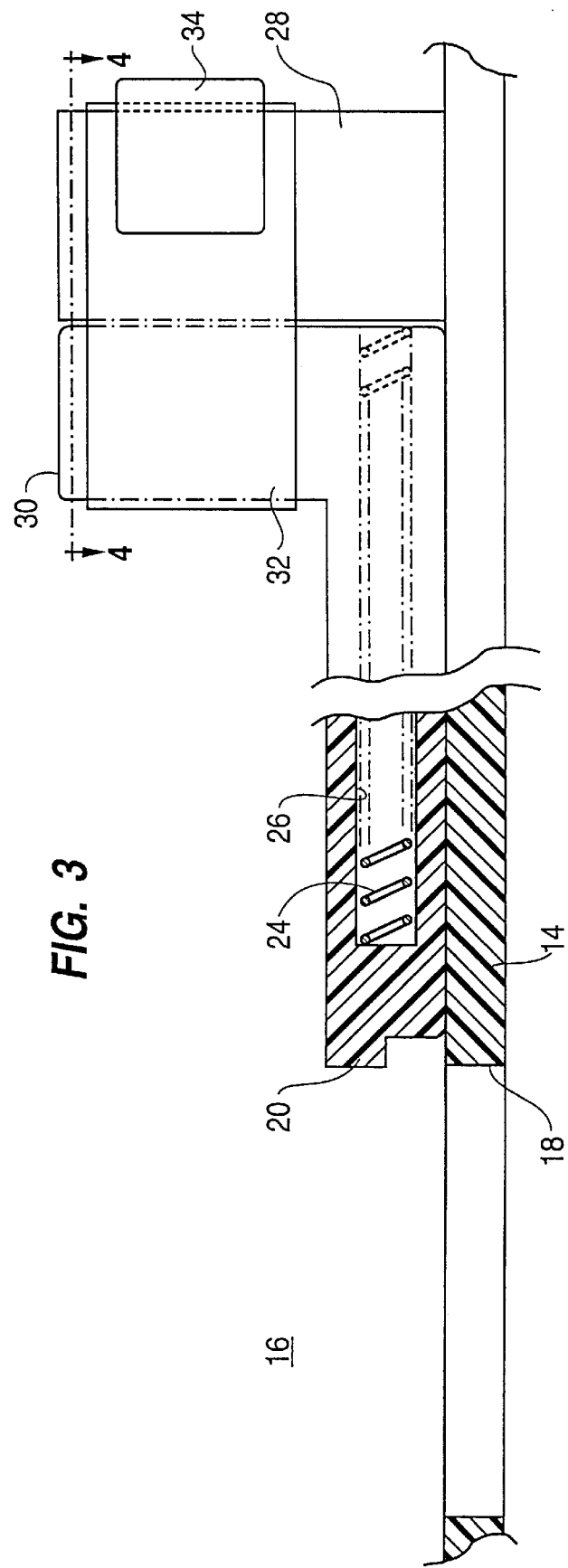

MOUSE TRAP

BACKGROUND OF THE INVENTION

1. Field of the Invention

This invention relates to a disposable, pre-set, pre-baited, mouse trap. More particularly, this invention relates to a trap for small rodents and the like, which is sold in a pre-set position with bait installed in the trap so that nibbling on the bait unwittingly breaks a retaining member and releases a biased slidable member to close an entrance and prevent egress.

2. Description of the Related Art

Animal traps, and in particular those intended for small rodents such as mice and rats, are known in the art. A well-known example is a mousetrap having a spring-biased lever arm which is released when the animal depresses a plate supporting a bait in a manner which is designed to kill the rodent. Such an approach is inconvenient in that, while the trap is reusable, it requires baiting by its user and disposal of the dead mouse after each trap operation.

U.S. Pat. No. 4,127,958 discloses an example of a mousetrap having a telescoping housing member movable between a set position and a closed position. Actuation of a trigger mechanism by the mouse delivers a fatal blow while causing the housing member to close and enclose the carcass of the slain rodent.

Another example of a disposable animal trap is shown in U.S. Pat. No. 4,231,180 which similarly includes slidable interfitting plastic members biased axially toward each other to close an animal entrance in the trap to retain the animal within the interior of the trap. Within the trap, the animal releases a detent member by depressing a trigger plate housing a bait.

Still another example of a disposable mousetrap is found in the applicant's prior issued U.S. Pat. No. 4,769,942.

SUMMARY OF THE INVENTION

It is an objective of this invention to provide a pre-set, pre-baited, disposable mousetrap which features a construction which facilitates assembly and operation of the trap.

It is an additional object of this invention to provide a trap having a spring loaded member which released to trap an animal in response to the animal nibbling through a restraining member in order to gain better access to a piece of bait.

In brief, the above objects are achieved by an arrangement wherein a recessed post member is formed on a lid member and secured to a post member formed on a housing member which is closed by the lid, using a tape which is lapped about both posts. The tape is arranged to interfere with easy access to the bait, which can be peanut butter, so that a rodent will gnaw through the tape. Once the tape is broken its retaining function is removed and the door is free to close under the influence of a spring produced bias. The shape of the recessed post member is selected to reduce the amount of contact area with the tape and to facilitate release of the post from the binding hold of the tape once it is rent, thus ensuring reliable operation of the trap.

More specifically, a first aspect of the present invention resides in a mouse trap comprising: a housing; a cover for closing the housing and defining a cell therein, the cover having an entrance opening providing access to the cell; a door, disposed in the housing for closing the entrance opening; biasing means for biasing the door toward a closed position wherein the door closes the entrance opening and egress from the cell is prevented; a first recessed post-like structure integral with the sliding door; a second post-like structure integral with the housing; tape means lapped about the first and second post-like structures for maintaining the door in an open position wherein the entrance is open and access to the cell is permitted, until the tape is rent; and a bait disposed in a recess of the recessed post so as to be covered by the tape.

A second aspect of the invention resides in a trap for the live entrapment of animals, such as mice, comprising: an elongated housing having a wall defining an opening therein, sized for entry of a small animal; a slidable member located within the housing, adjacent an interior surface of the opening defining wall, and capable of being positioned in a first position which it is retracted from the opening and in a second position wherein it seals the opening in a substantially air tight manner and prevents exit of the small animal from the trap; means for biasing the slidable member in the first position toward the second position; and means for retaining the slidable member in the first position, the retaining means including a first post rigid with the slidable member, a second post rigid with the housing and a piece of tape interconnecting the first and second posts, the piece of tape cooperating with bait within the trap so that eating activity of the animal on the retaining means to reach the bait releases the slidable member allowing it to axially move from the first position to the second position.

A third aspect of the present invention resides in a trap for the live entrapment of animals, such as mice, comprising: a generally elongated housing having a plurality of walls, at least one of the walls defining an opening therein, sized for entry of a small animal; a slidable member located adjacent an interior surface of the opening-defining wall and capable of being positioned in a first position wherein the opening is unrestricted and in a second position wherein the opening is sealed against exit of the small animal from the trap, the opening-defining wall defining a guide rail adjacent each of an upper and lower surface in the trap, the slidable member cooperating with the guide rails to be axially slidable to and fro within the interior of the trap to cover and uncover the opening; means for biasing the slidable member from the first position toward the second position, the biasing means comprising a compression spring located in a first bore in the slidable member, and a second bore in the opening-defining wall which is in register with the bore on the slidable member; means for retaining the slidable member in the first position, the retaining means including a first projection formed on the slidable member, a second projection formed on the housing, and a piece of tape interconnecting the first and second projections in a manner to maintain the slidable member in the first position against the bias of the biasing means until nibbling of the tape by the animal to gain access to bait which is disposed within the trap and covered by the tape, breaks the tape and allows the slidable member to be biased from the first position to the second position; and means for closing the opening, the closing means being readily removable to prepare the trap for immediate use.

BRIEF DESCRIPTION OF THE DRAWINGS

The various features and advantages of the present invention will become more clearly appreciated from the following detailed description of the invention taken in conjunction with the accompanying drawings in which:

FIG. 3 is a partially sectioned view taken along line 3—3 of FIG. 2 showing a piece of tape lapped about a shaped bait receiving member and a post to retain the door in an open position;

FIG. 4 is a sectional view taken along section line 4—4 showing the configuration of the bait receiving member which is formed integrally with the sliding door of the trap, and a post which is shaped to receive a retaining clip in accordance with a variant of the present invention;

DETAILED DESCRIPTION OF THE PREFERRED EMBODIMENT

Figure 1:
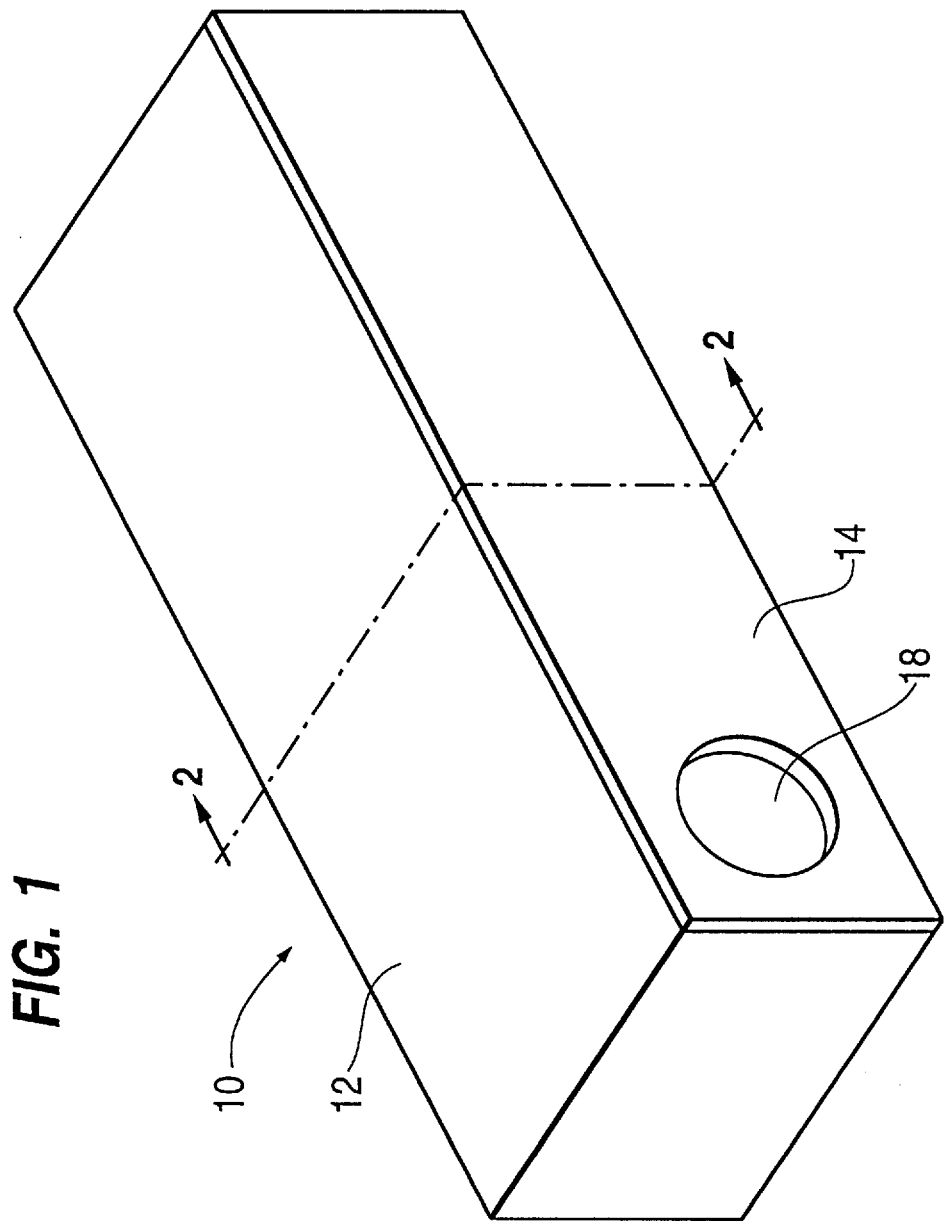
FIG. 1 is a top perspective view of the disposable mousetrap according to an embodiment of the invention shown with an access opening open ready for an inquisitive rodent.
Figure 2:
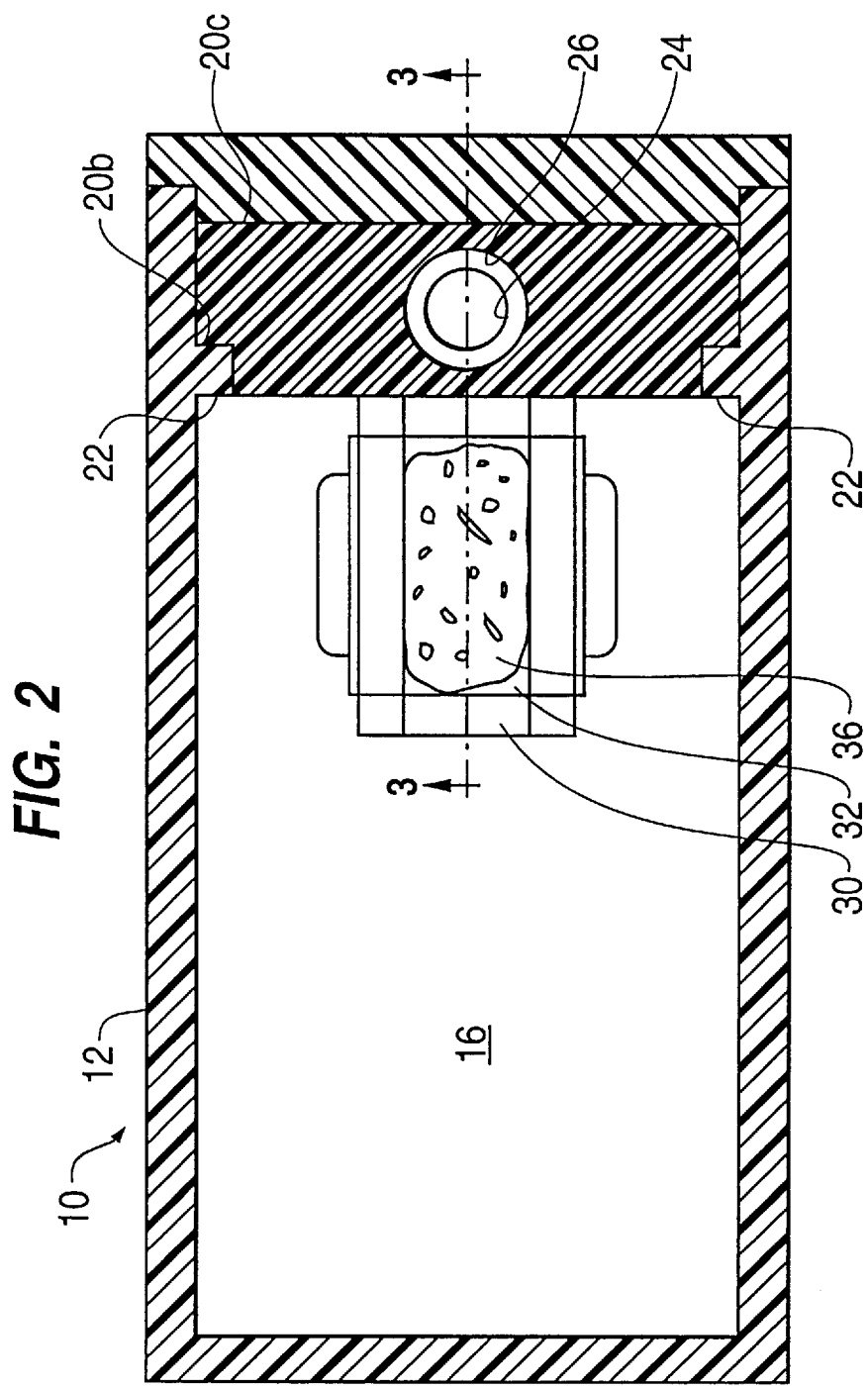
FIG. 2 is a cross-sectional view taken along line 2—2 of FIG. 1.

As seen in FIGS. 1 to 3, a disposable mousetrap which is pre-baited and pre-set to trap an animal, for example a rodent such as a common house or field mouse, is denoted generally by the reference numeral 10. In this embodiment of the invention, the trap 10 is formed from a single piece molded rectangular plastic casing or housing 12 and a plastic lid or side cover member 14. The side cover member 14 fits into a rectangular opening of the housing 12 to form a space or cell 16, as seen in FIG. 2. A suitably sized opening 18 is formed at one end of the side cover member 14 to define an entrance which permits access to the interior of the cell 16. One side 20b of a sliding door 20 is suitably supported on guide rails 22 which are integrally molded on inner opposed side walls of the housing 12, a second side 20c of the sliding door 20 is supported and by an inner face of the side cover member 14. The door 20 is biased by a compression spring 24, which is disposed in a blind bore 26, to move to a position wherein the door closes the opening 18. As best seen in FIG. 4, the side cover member 14 is formed with a post 28 against which the spring 24 reacts and to which a V-shaped channel bait holder post 30, which is integral with the sliding door 20, is secured by a length of tape 32 that is lapped one or more times about both posts 28, 30 in the manner illustrated in FIGS. 3 and 4.

In this embodiment, the tape 32 is additionally secured to the post 28 by a clip 34. This clip 34 is optional; however, its provision does assist in assuring that the tape 32, once lapped in place, remains in the desired position and therefore assists in providing a trouble-free assembly and attenuates the possibility that the tape 32 will unexpectedly fail to retain the sliding door in its open position until such time as a rodent, for example, has nibbled through and broken the restraining layers of tape 32 in order to gain full access to the bait 36. The shape of the V-shaped channel bait holder post 30 facilitates the release of the sliding door 20 upon the tape 32 being rent by the nibbling action of a rodent or the like type of intruder, in that its shape greatly reduces the surface area which is in contact with the tape 32. This configuration greatly reduces the risk that the tape 32 will undesirably stick to the sides of the post and prevent the trap 10 from functioning properly. Accordingly, the post structure which is used in the present invention is such as to provide both a suitable hopper type of arrangement for the bait, and to reduce the risk of trap malfunction.

It will be noted that the tape 32, which is used in the embodiments of the invention, is an adhesive coated cellophane type tape 32. It should also be noted that tape 32 is also available in preformed round continuous strips or rings. These rings are approximately ⅜" to ½" wide and sized to slip over the V-shaped channel bait holder post 30 and the stationary post 28.

The operation of this embodiment is similar to that disclosed in U.S. Pat. No. 4,769,942 issued on Sep. 13, 1988, in the name of the applicant. The content of this patent is hereby incorporated by reference thereto. In brief, in the event that the tape 32 is broken by a rodent, the spring 24 drives the door 20 along the guide rails 22 to a position wherein the opening or entrance 18 is closed in a manner which traps the intruder within the cell 16.

The typical size of the housing, in accordance with the present invention, is larger than that used in the above mentioned patent and the depth of the housing may be 50% deeper than the width to allow for the space which is taken up by the improved bait holder arrangement. In accordance with the present invention, it is possible to render the closure of the opening 18 essentially air-tight so that the trapped rodent or intruder tends to asphyxiate within the trap.

In addition to the provision of bait, it is also possible, in accordance with the present invention, to apply newly-developed scent attractants for rodents to either or both of the interior and exterior of the trap 10. This scent material can be applied in any suitable manner such as a sponge which is saturated in the scent or some suitable spray device. A piece of porous tape, which is saturated in the scent, can alternatively be fixed to a suitable surface of the trap if preferred.

Figure 5:
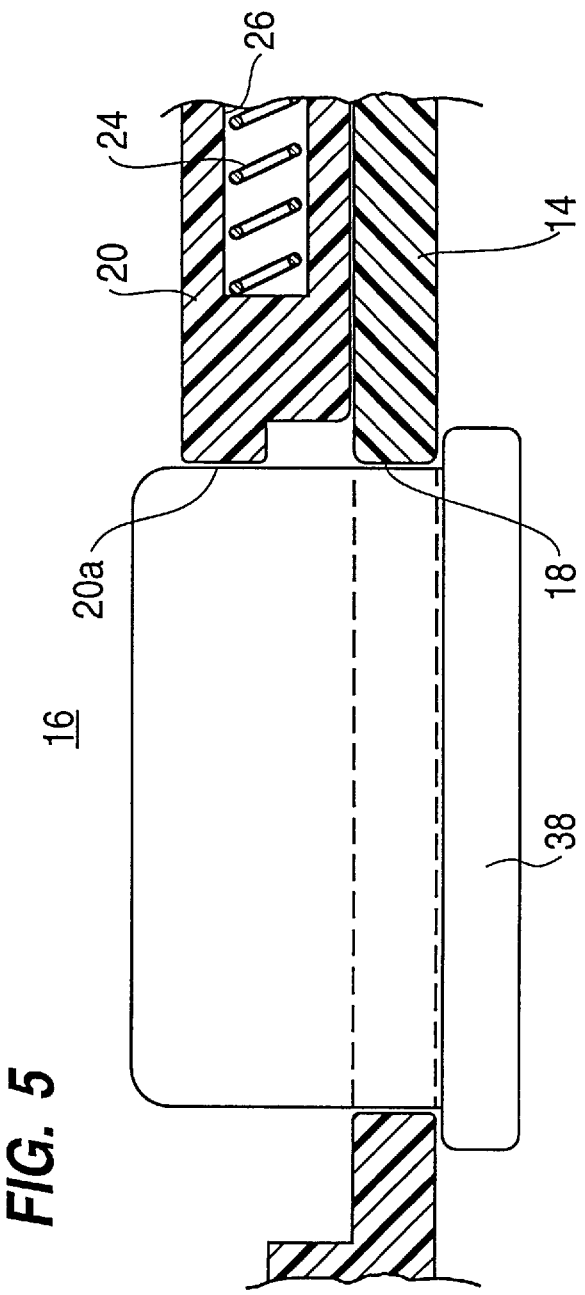
FIG. 5 is a sectional view showing the use of a plug which is disposed in the entrance of the trap in order to temporarily close the entrance of the trap and which reduces the strain on the retaining member while it is in transport/storage.

FIG. 5 shows a plug 38 which is used in accordance with the invention. This plug 38 temporarily closes the trap while it is being transported and while it is in storage. As shown in this figure, the plug 38 is arranged to engage an edge portion 20a of the door 20 in a manner which reduces the strain placed on the tape 32 by the spring 24 and attenuates the detrimental effect that vibration and the like (e.g. such as produced during transport from one place to another) may additionally have on the tape and/or its disposition.

Figure 6:
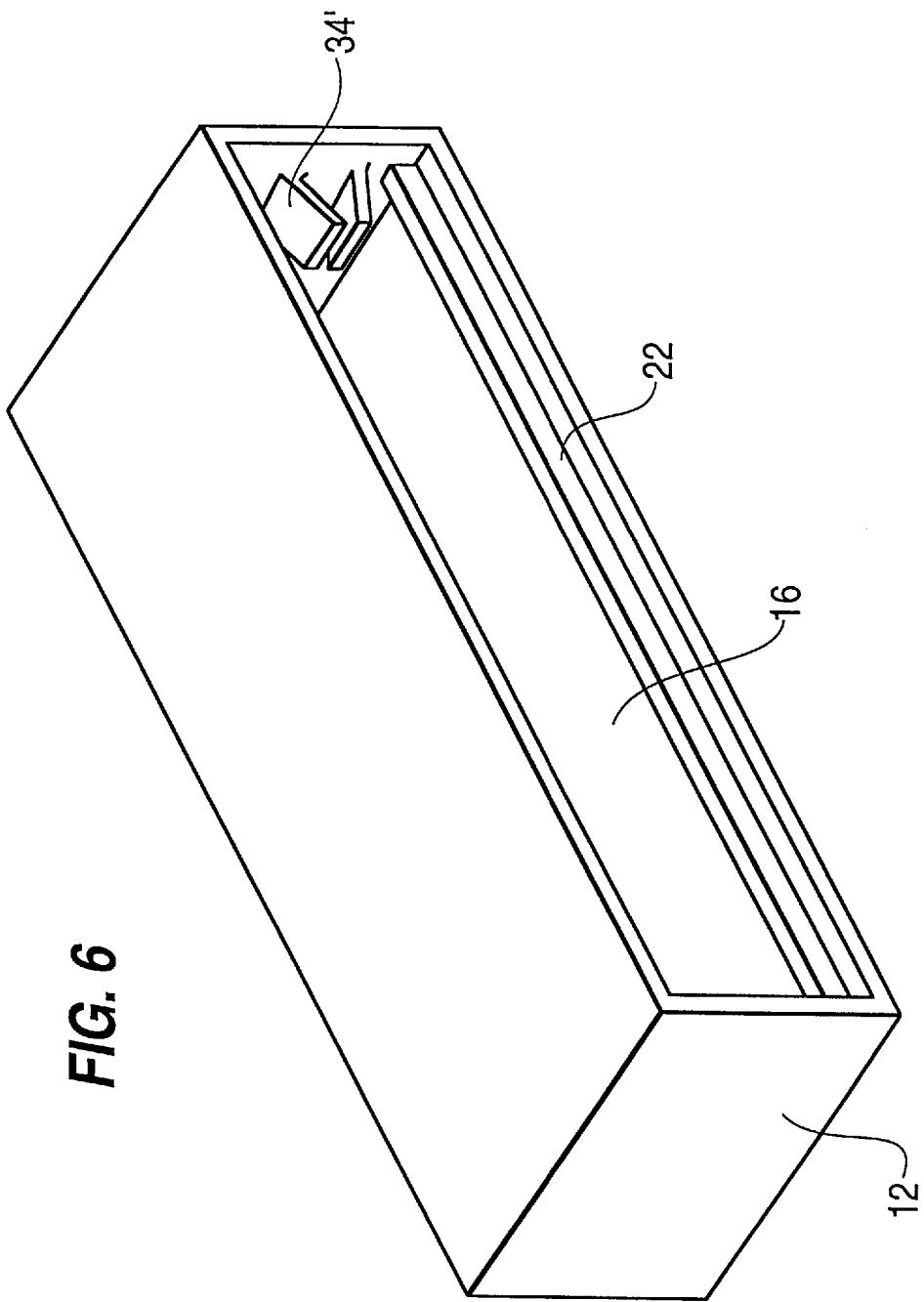
FIG. 6 is a perspective view showing the trap with the cover removed and depicting the configuration of a clip that is formed integrally with the main container member of the trap.
Figure 7:
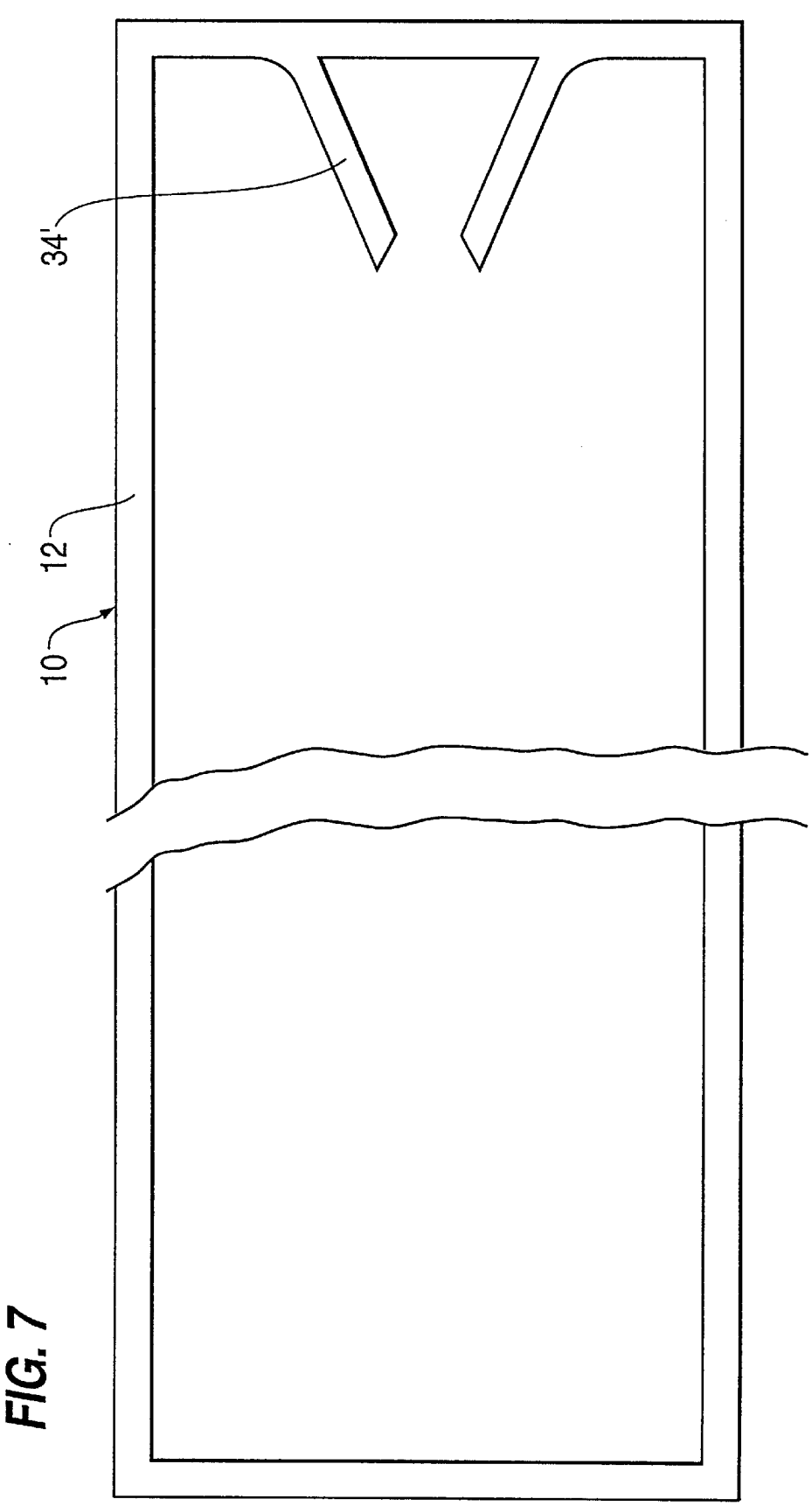
FIG. 7 is a side view showing the clip which is depicted in FIG. 5.
Figure 8:
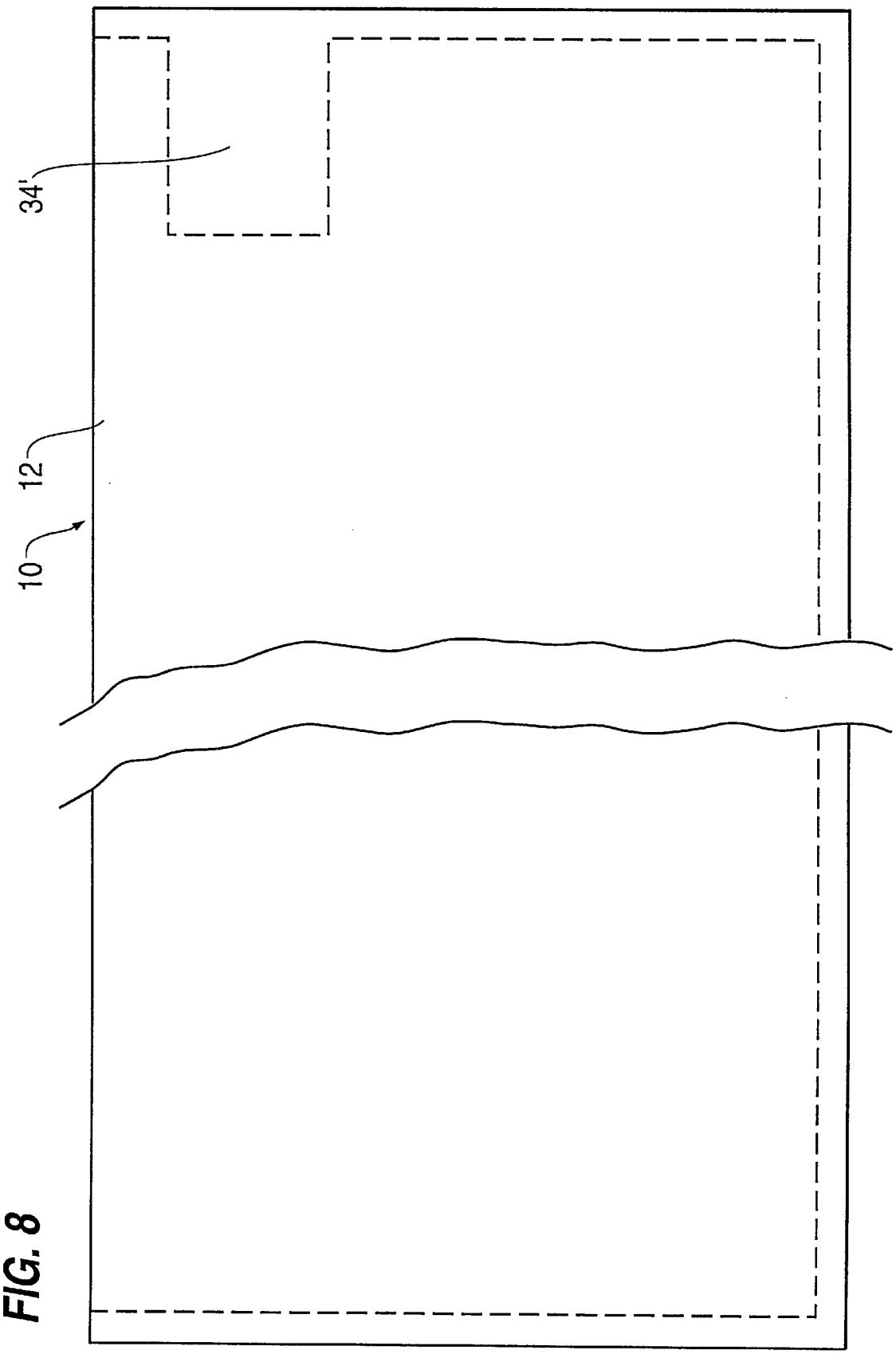
FIG. 8 is a plan view of the housing showing the position of the integral clip.

In accordance with another aspect of the present invention, the clip 34', which is used to secure the tape to the post 28, can be formed so as to be integral with the housing 12 in the manner illustrated in FIGS. 6, 7 and 8. This construction facilitates assembly by allowing the step of disposing the slidable door 12 onto the guide rails 22, to insert the post 28 directly into the clip 34' and thus reduce the number of operations necessary in order to achieve a finally assembled trap 10.

While the invention has been disclosed with reference to only one basic design, it will be appreciated that various changes may be made without departing from the scope of the invention which is limited only by the appended claims. For example, the invention is not limited to the use of a V-shaped channel bait holder post 30, any suitable other shape, such as U-shaped member, conical-shaped member or the like, can be used. The door which is used in the disclosed embodiment is of the sliding type. However, the invention is not limited to sliding doors and a pivotal type door could be used in connection with the posts and a torsion spring to swing the door closed, for example.

What is claimed is:

1. A mouse trap comprising:

a housing;

a cover for closing an opening of the housing and defining a cell therebetween, said cover having an entrance opening providing access to the cell;

a door, disposed in said housing for closing the entrance opening;

biasing means for biasing the door toward a closed position wherein the door closes the entrance opening and egress from the cell is prevented;

a first post structure integral with and projecting from the door, having a recessed portion;

a second post structure integral with the housing;

tape means lapped about the first and second post structures for maintaining the door in an open position wherein the entrance is open and access to the cell is permitted, until the tape is rent; and a bait disposed in the recessed portion of the first post structure so as to be covered by the tape.

2. A mouse trap as set forth in claim 1, wherein said first post structure is shaped in a manner which reduces the amount of surface area in contact with said tape to minimize interface between the tape and the first post structure and resistance to separation of said first post structure from said second post structure when the tape is broken by a creature gnawing through the tape in an attempt to gain free access to said bait.

3. A mouse trap as set forth in claim 1, further comprising a plug which can be temporarily inserted into the entrance opening to close the entrance opening and to engage an edge portion of the door.

4. A mouse trap as set forth in claim 1, wherein said housing is a single piece molded plastic body formed with guide rails.

5. A mouse trap as set forth in claim 4, wherein said cover is made of plastic and is arranged to support the door so that one side of the door is slidable along the guide rails and a second side is slidable along an inner face of said cover.

6. A mouse trap as set forth in claim 5, wherein said door is formed with a blind bore, and wherein said biasing means is a compression spring which is disposed in the blind bore.

7. A mouse trap as set forth in claim 6, wherein said compression spring has an end which engages said second post structure to produce a bias which acts in a direction which tends to drive said door in a direction away from said second post structure to a position wherein it closes the entrance opening.

8. A mouse trap as set forth in claim 1, further comprising a clip which is clipped onto said tape in a manner which secures it to said second post structure.

9. A mouse trap as set forth in claim 5, further comprising a clip for securing said tape to said second post structure, said clip being formed integrally with said housing and so arranged that said second post structure is inserted into said clip when said door is disposed in sliding engagement with the guide rails formed in said housing.

* * * * *